US012616225B2

(12) United States Patent
Farres et al.

(10) Patent No.: US 12,616,225 B2
(45) Date of Patent: May 5, 2026

(54) PETFOOD COMPOSITION AND PROCESS FOR PREPARATION THEREOF

(71) Applicant: Société des Produits Nestlé S.A., Vevey (CH)

(72) Inventors: Isabel Fernandez Farres, Lausanne (CH); Paulo Alexandre Braga Fernandes, Amiens (FR)

(73) Assignee: SOCIETE DES PRODUITS NESTLE S.A., Vevey (CH)

( * ) Notice: Subject to any disclaimer, the term of this patent is extended or adjusted under 35 U.S.C. 154(b) by 729 days.

(21) Appl. No.: 17/424,266

(22) PCT Filed: Feb. 19, 2020

(86) PCT No.: PCT/IB2020/051403
§ 371 (c)(1),
(2) Date: Jul. 20, 2021

(87) PCT Pub. No.: WO2020/170174
PCT Pub. Date: Aug. 27, 2020

(65) Prior Publication Data
US 2022/0110341 A1 Apr. 14, 2022

(30) Foreign Application Priority Data
Feb. 20, 2019 (EP) ..................................... 19158370

(51) Int. Cl.
*A23K 10/30* (2016.01)
*A23K 20/163* (2016.01)
(Continued)

(52) U.S. Cl.
CPC ............ *A23K 10/30* (2016.05); *A23K 20/163* (2016.05); *A23K 20/22* (2016.05); *A23K 40/00* (2016.05);
(Continued)

(58) Field of Classification Search
CPC ...... A23K 10/30; A23K 20/163; A23K 20/22; A23K 40/00; A23K 50/48; A23L 29/238;
(Continued)

(56) References Cited

U.S. PATENT DOCUMENTS 2,427,594 A * 9/1947 Frieden ................. A23L 29/256
536/52
2,466,146 A 4/1949 Baker
(Continued)

FOREIGN PATENT DOCUMENTS

CN 102757514 10/2013
EP 0018153 A1 10/1980
(Continued)

OTHER PUBLICATIONS

Frazier et al., Food Microbiology 4th Edition, 1988, pp. 91-95, William C. Frazier & Dennis C. Westhoff (Year: 1988).*
(Continued)

*Primary Examiner* — Drew E Becker

(57) ABSTRACT
The present invention relates to a process for making a pet food composition comprising a red seaweed as a natural gelling agent with enhanced palatability. The compositions of the invention can be devoid of commonly used, chemically treated gelling agents such as carrageenan, alginate, agar, gellan gum.

11 Claims, 1 Drawing Sheet

(51) Int. Cl.

| | |
|---|---|
| *A23K 20/22* | (2016.01) |
| *A23K 40/00* | (2016.01) |
| *A23K 50/48* | (2016.01) |
| *A23L 17/60* | (2016.01) |
| *A23L 29/238* | (2016.01) |
| *A23L 29/25* | (2016.01) |
| *A23L 29/256* | (2016.01) |
| *A23L 29/262* | (2016.01) |
| *A23L 29/269* | (2016.01) |

(52) U.S. Cl.
CPC .............. *A23K 50/48* (2016.05); *A23L 17/60* (2016.08); *A23L 29/238* (2016.08); *A23L 29/25* (2016.08); *A23L 29/256* (2016.08); *A23L 29/262* (2016.08); *A23L 29/27* (2016.08)

(58) Field of Classification Search
CPC ...... A23L 29/256; A23L 29/262; A23L 29/27; A23L 17/60; A23L 23/00; A23L 29/25; A23V 2200/242–244; A23V 2250/50–5118
USPC ................................................. 426/805, 131
See application file for complete search history.

(56) References Cited

U.S. PATENT DOCUMENTS

| | | | | |
|---|---|---|---|---|
| 3,094,517 A | | 6/1963 | Stanley | |
| 3,519,434 A | * | 7/1970 | Schuppner, Jr. ......... | A23G 9/32 |
| | | | | 426/805 |
| 3,821,424 A | * | 6/1974 | Gould ................... | A23L 3/3454 |
| | | | | 426/652 |
| 3,968,255 A | * | 7/1976 | Haas ...................... | A23K 10/14 |
| | | | | 426/35 |
| 3,982,003 A | * | 9/1976 | Mitchell ............... | A23L 29/231 |
| | | | | 426/805 |
| 4,328,118 A | * | 5/1982 | Friedmann .............. | A23L 17/60 |
| | | | | 516/77 |
| 4,330,562 A | * | 5/1982 | Nassar ................... | A23K 20/20 |
| | | | | 426/805 |
| 4,427,704 A | * | 1/1984 | Cheney ................. | A23L 29/206 |
| | | | | 426/573 |
| 4,656,041 A | * | 4/1987 | Yagi .......................... | A23J 3/10 |
| | | | | 426/802 |
| 4,894,250 A | * | 1/1990 | Musson .................. | A23L 29/27 |
| | | | | 426/573 |
| 5,792,504 A | * | 8/1998 | Poppel .................... | A23J 3/227 |
| | | | | 426/805 |
| 5,801,240 A | | 9/1998 | Rideout | |
| 10,426,184 B1 | * | 10/2019 | Sun .......................... | A23L 17/60 |

| | | | | |
|---|---|---|---|---|
| 2004/0131745 A1 | * | 7/2004 | Fernandes .............. | A23K 50/40 |
| | | | | 426/573 |
| 2005/0202038 A1 | * | 9/2005 | Green .................... | A61K 36/04 |
| | | | | 424/195.17 |
| 2007/0098846 A1 | * | 5/2007 | Su .......................... | A21D 13/04 |
| | | | | 426/18 |
| 2008/0287300 A1 | * | 11/2008 | Kopesky ................ | A61Q 11/00 |
| | | | | 426/573 |
| 2009/0028899 A1 | * | 1/2009 | Noda ...................... | A23L 17/60 |
| | | | | 424/195.17 |
| 2012/0244256 A1 | * | 9/2012 | Jong-Nam ............ | A23L 29/256 |
| | | | | 426/575 |
| 2013/0266655 A1 | * | 10/2013 | Mendes ................ | A23L 33/105 |
| | | | | 424/490 |
| 2014/0303264 A1 | * | 10/2014 | Tan ........................ | A61K 36/03 |
| | | | | 536/56 |
| 2014/0308737 A1 | | 10/2014 | Laaman | |
| 2015/0164125 A1 | * | 6/2015 | Di Tommaso .......... | A23L 3/485 |
| | | | | 99/474 |
| 2015/0342223 A1 | * | 12/2015 | Lin ........................ | A23K 20/10 |
| | | | | 426/546 |
| 2016/0338383 A1 | * | 11/2016 | Daru .................... | A23K 20/163 |
| 2018/0343894 A1 | | 12/2018 | Lammers et al. | |
| 2019/0150488 A1 | * | 5/2019 | Lara ........................ | A23L 13/67 |
| 2019/0343158 A1 | * | 11/2019 | Sun ........................... | A23L 5/49 |
| 2021/0000896 A1 | * | 1/2021 | Mazoyer .............. | A23K 20/163 |
| 2021/0298326 A1 | * | 9/2021 | Zotter .................. | A23L 33/195 |
| 2021/0337842 A1 | * | 11/2021 | Agoda-Tandjawa .... | A23L 17/60 |
| 2022/0007701 A1 | * | 1/2022 | Giri Rao V V ......... | A23L 33/22 |

FOREIGN PATENT DOCUMENTS

| | | |
|---|---|---|
| WO | 9817126 A1 | 4/1998 |
| WO | 2016085322 A1 | 6/2016 |

OTHER PUBLICATIONS

European Search Report to EP application No. 19158370 dated Jul. 26, 2019.

Wikipedia, "Carrageenan" https://en.wikipedia.org/wiki/Carragee retrieved on Jul. 25, 2019 XP055608722.

Wikipedia, "Eucheuma" https://en.wikipedia.org/wiki/Eucheuma retrieved on Jul. 23, 2019 XP055608181.

Wikipedia, "Chondrus crispus" https://en.wikipedia.org/wiki/ Chondrus crispus retrieved on Jul. 23, 2019 XP055608190.

International Search Report to PCT application No. PCT/IB2020/ 051403 dated Apr. 2, 2020.

Xixi et al., "Effect of Eucheuma Spinosum on Gelation and Rheological Properties of Chicken Breast Batters", Food Science, vol. 39, Issue No. 5, Dec. 31, 2018, pp. 76-80.

* cited by examiner

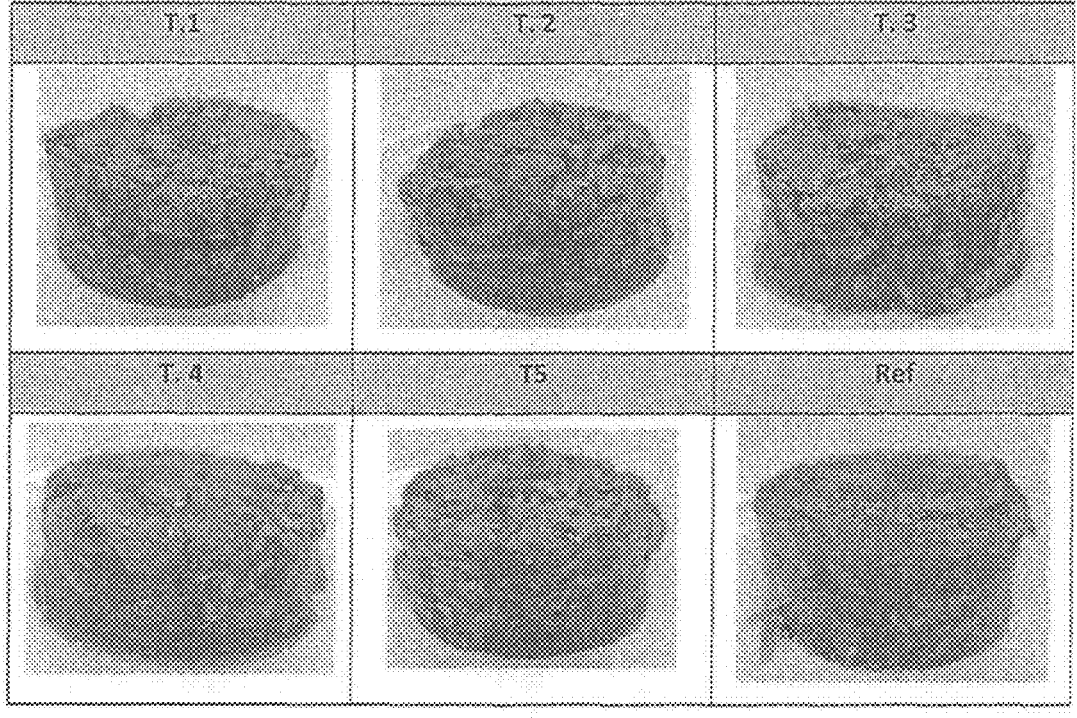

PETFOOD COMPOSITION AND PROCESS FOR PREPARATION THEREOF

CROSS REFERENCE TO RELATED APPLICATIONS

This application is a national stage application under 35 USC § 371 of PCT/IS2020/051403 filed on Feb. 19, 2020 and claims priority to EP Application Serial No. 19158370.7 filed Feb. 20, 2019, the disclosures of which are incorporated herein by this reference.

BACKGROUND OF THE INVENTION

Many commercially available pet food compositions using hydrocolloid systems, e.g. chunk in jelly cat food compositions, use gelling hydrocolloids such as kappacarrageenan, alginate, agar or gellan gum alone or in combination for achieving the desired jelly texture for both processing and palatability.

However, consumers are becoming increasingly concerned about the use of undesirable additives. Hence, there is a need to develop natural ingredient alternatives to those hydrocolloid systems that would impart similar or enhanced qualities in terms of product appearance, texture and palatability.

There are currently no solutions for reducing the amount of hydrocolloids without detrimental effects on product quality. These defects include sedimentation of chunks in the can, as well as inconsistencies in the amounts of gravy and chunks when the can is filled.

Nowadays, it is very common that pets consume the same product their entire lives. Such foods therefore need to be nutritionally complete and not create any digestion issues.

It is known that a significant amount of hydrocolloids in pet food leads to detrimental effects on digestibility (for example, low fecal scores).

Additionally, existing pet food processing generally use 2 step filling of the can wherein the viscosity of the gravy does not need to be above a specific value for filling. The disadvantage of using the 2 step filling process industrially is that it may lead to inconsistencies in the amounts of gravy and food chunks in each can.

There is a clear need for developing technological solutions which would enable formulation of pet food products with lower amounts of hydrocolloids.

BRIEF DESCRIPTION OF FIGURES

FIG. 1 shows various chunk-in-jelly cat food compositions with red seaweed in accordance with embodiments of the present disclosure with Kappa carrageenan jelly recipe used as a reference.

DESCRIPTION OF THE INVENTION

Definitions

As used in this disclosure and the appended claims, the singular forms "a," "an" and "the" include plural referents unless the context clearly dictates otherwise. Thus, for example, reference to "a hydrocolloid thickener" or "the hydrocolloid thickener" includes two or more such thickeners. The term "and/or" used in the context of "X and/or Y" should be interpreted as "X," or "Y," or "X and Y." Where used herein, the terms "example" and "such as," particularly when followed by a listing of terms, are merely exemplary and illustrative, and are not exclusive or comprehensive.

As used herein, "about" is understood to refer to numbers in a range of numerals, for example the range of −10% to +10% of the referenced number, within −5% to +5% of the referenced number, or in one aspect, within −1% to +1% of the referenced number, and in a specific aspect, within −0.1% to +0.1% of the referenced number. Furthermore, all numerical ranges herein should be understood to include all integers, whole or fractions, within the range. Moreover, these numerical ranges should be construed as providing support for a claim directed to any number or subset of numbers in that range. For example, a disclosure of from 1 to 10 should be construed as supporting a range of from 1 to 8, from 3 to 7, from 1 to 9, from 3.6 to 4.6, from 3.5 to 9.9, and so forth.

All percentages expressed herein refers to total weight % in the gravy, sheared gel gravy, pet food composition, or chunk-in-jelly cat food composition, as specified in the description. The final composition includes water unless specified otherwise. The recipes in the examples illustrate how % wt. is to be understood by the skilled person in the art. When reference is made to the pH, values correspond to pH measured at 25° C. with standard equipment. An "amount" can be the total amount of the referenced component per serving of the composition or per distinct unit of the composition and/or can be the weight percentage of the referenced component by dry weight. Moreover, an "amount" includes zero; for example, the recitation of an amount of a compound does not necessarily mean that the compound is present, unless followed by a range that excludes zero.

The terms "food," "food product" and "food composition" mean a product or composition that is intended for ingestion by an animal and provides at least one nutrient to the animal. Further in this regard, these terms mean that the product or composition is in a form ready for consumption and is not merely an intermediate from which a consumable product or composition is made, although other food compositions can be added in some embodiments. The term "pet food" or "pet food composition" means any food composition intended to be consumed by a pet. The term "pet" means any animal which could benefit from or enjoy the compositions provided by the present disclosure. For example, the pet can be an avian, bovine, canine, equine, feline, hircine, lupine, murine, ovine, or porcine animal, but the pet can be any suitable animal. As such, the term "cat food composition" means any food composition intended to be ingested by a cat.

The term "complete and balanced" when referring to a food composition means a food composition that contains all known required nutrients in appropriate amounts and proportions based on recommendations of recognized authorities in the field of animal nutrition, and are therefore capable of serving as a sole source of dietary intake to maintain life or promote production, without the addition of supplemental nutritional sources. Nutritionally balanced pet food and animal food compositions are widely known and widely used in the art, e.g., complete and balanced food compositions formulated according to standards established by the Association of American Feed Control Officials (AAFCO).

The term "companion animal" means a dog or a cat.

"Wet food" means a pet food having a moisture content from about 50% to about 90%, and in one aspect, from about 70% to about 90%. "Dry food" means a pet food having a moisture content less than about 20%, and in one aspect, less than about 15%, and in a specific aspect, less than about 10%. "Semi-moist food" means a pet food having a moisture content from about 20% to about 50%, and in one aspect, from about 25% to about 35%.

"Gravy" refers to a viscous liquid that becomes a jelly after heat treatment and upon cooling.

The term "chunk-in-jelly" as used herein refers to a food product composed of food chunks and mixed with a jelly in an approximately ratio of from 25/75 to about 60/40. Hydrocolloid system as used herein refers to gravies, jellies and other semi-solid compositions.

The term "semi-solid" as used herein refers to a material whose physical properties lie between that of a liquid and that of a solid.

The term "chunk-in-jelly cat food composition" as used herein refers to a cat food product composed of food chunks and mixed with a jelly in an approximately ratio of from 25/75 to about 60/40.

The term "mechanically disrupted seaweed" as used herein typically refers to ground seaweed, milled seaweed, cut seaweed. Preferably, the maximum average longest diameter of each seaweed piece after grinding, milling, or cutting is between 150 micron and 3 mm. The seaweed is water-washed, as opposed to carrageenan and/or semi-refined carrageenan which are both chemically modified, for example alkali-treated. Mechanically disrupted seaweed is not chemically modified.

The term "potassium source" refers to any compound containing ionic potassium. In one embodiment, the potassium source is be selected from the group consisting of potassium chloride, potassium sulphate, potassium carbonate, and mixtures thereof.

The term "receptacle" as used herein may ref to a can, a pouch, or a tray.

The term "vegetable protein source" refers to an protein derived from a vegetable as known in the art. In one embodiment, the vegetable protein source is selected from the group consisting of wheat gluten, pea protein, egg protein, soy protein, and mixtures thereof.

In the present description, meat and meat byproducts used as food chunks are understood to mean all the fleshy parts of slaughtered warm-blooded animals in the fresh state or preserved by an appropriate treatment and all the products and by-products arising from the processing of the bodies or body parts of warm-blooded animals. Meat is understood to mean in particular the meat from chickens, rabbits, bovines or ovines and offal. Offal is understood to mean lung lobes as well as livers or kidneys. Meat by-products is understood to mean the meal obtained from carcasses of the above mentioned animals. In the present description, fish and fish by-products will be regarded as coming within the definition of meat and meat by-products. Fish and fish by-products are understood to mean fish or fish parts in the fresh state or preserved by an appropriate treatment, as well as the byproducts of their processing. Salmon or sardines can be used as fish and fish meal can be used as by-products.

Embodiments discussed herein can be used interchangeably between products and processes. For example, a hydrocolloid thickener discussed in the context of a process, e.g., a process for making a hydrocolloid system or making a chunk-in-jelly formulation, can be also used in the context of a product, e.g., a gravy, chunk-in-jelly, or hydrocolloid system.

The compositions disclosed herein may lack any element that is not specifically disclosed herein. Thus, a disclosure of an embodiment using the term "comprising" includes a disclosure of embodiments "consisting essentially of" and "consisting of" the components identified. Similarly, the methods disclosed herein may lack any step that is not specifically disclosed herein. Thus, a disclosure of an embodiment using the term "comprising" includes a disclosure of embodiments "consisting essentially of" and "consisting of" the steps identified. Any embodiment disclosed herein can be combined with any other embodiment disclosed herein unless explicitly and directly stated otherwise.

Unless defined otherwise, all technical and scientific terms and any acronyms used herein have the same meanings as commonly understood by one of ordinary skill in the art in the field of the invention. Although any compositions, methods, articles of manufacture, or other means or materials similar or equivalent to those described herein can be used in the practice of the present invention, the preferred compositions, methods, articles of manufacture, or other means or materials are described herein.

All patents, patent applications, publications, and other references cited or referred to herein are incorporated herein by reference to the extent allowed by law. The discussion of those references is intended merely to summarize the assertions made therein. No admission is made that any such patents, patent applications, publications or references, or any portion thereof, are relevant prior art for the present invention and the right to challenge the accuracy and pertinence of such patents, patent applications, publications, and other references is specifically reserved.

Embodiments

In the present invention, the present inventors have discovered the use of a natural gelation system that allows for one step filling as well as lower amounts of hydrocolloids. Additionally, the present hydrocolloid systems can be devoid of commonly used, chemically treated gelling agents such as carrageenan, alginate, agar, gellan gum. In the present invention, gelation of natural red seaweeds can be induced during the manufacturing process of pet foods using hydrocolloid systems by adjusting key conditions (pH, temperature and amount of cations). The insoluble fibre fraction from the red seaweed is generally left in the jelly of the final product. Although the insoluble fibre contribution to the gel strength is lower compared to traditional soluble carrageenan, the final jelly has excellent texture so that the final product has enhanced quality, appearance and palatability.

During the manufacturing process for pet foods, the gravy containing the red seaweed can be mixed with the food chunks. At this stage, the viscosity is generally above a specific value (2000 mPa·s, 20° C., 20 rpm, Brookfield RVT), preferably in the range 2000 to 6000 mPa·s, so that the chunks can be suspended (no sedimentation) and the cans can be consistently filled with the right amounts of food chunks. The viscosity target, optimal can filling and product quality can all be achieved with the present invention.

This technology also offers the advantage of avoiding the use of processed kappa-carrageenan (milling, hot alkali extraction, alcohol precipitation, drying, optional bleaching and milling) in pet food compositions, including chunk-in-jelly cat food compositions. A mechanically disrupted red seaweed (preferably with a maximum average particle length of 5 mm) can be used instead by adjusting processing conditions. The final product has similar properties to the traditional hydrocolloid systems in terms of appearance and palatability.

Furthermore, sheared gel gravies from red seaweeds can be successfully formed by application of a flow field to the seaweed solution while undergoing gelation. As a result, a suspension of micro-gelled particles can be formed with rheological properties significantly different to that of the original quiescent gel. Sheared gel gravy display a flow behavior that lies between that of a 'weak' and a 'strong' gel, with a clearly defined yield stress and a viscosity that remains constant on time. It has now been shown for the first time that sheared gel gravy from seaweeds can be formed in manufacturing process of pet food compositions including chunk-in-jellies. This enables a significant reduction of the total number of hydrocolloids (xanthan, locus bean gum) whilst maintaining optimal viscosity and gel strength values. This reduction in hydrocolloids amount can improve cat fecal consistency.

Another advantage of using sheared gel gravy with seaweeds for manufacturing pet food compositions, including chunk-in-jelly cat food compositions, is that the viscosity is not generally reduced with time hence enabling for greater flexibility during industrial production.

Accordingly, the invention relates in general to a process using red seaweed as a natural gelling agent for hydrocolloid systems used in pet foods, e.g., chunk-in-jelly cat food compositions, which can match or exceed palatability of traditional hydrocolloid systems, such as non-natural hydrocolloid systems. Further, such use can provide an additional benefit of using less hydrocolloids in pet food application. For example, an additional cooling and shearing step during the process can allow the total amount of hydrocolloids to be reduced by 5%, 10%, 15%, 20%, 25%, 30%, 35%, 40%, 45%, 50%, 55%, or even as much as 60%.

In particular, the invention relates to a process for making hydrocolloid systems comprising mixing mechanically disrupted seaweed and other ingredients in water to form the hydrocolloid system. Additionally, the present invention relates to a process for making a gravy, a pet food composition, including a chunk-in-jelly cat food composition, comprising mixing mechanically disrupted seaweed and other ingredients in water to produce a gravy and adding food chunks to produce a pet food composition.

In one embodiment, a process for making a pet food composition, e.g., a chunk-in-jelly cat food composition, can comprise mixing mechanically disrupted red seaweed, a potassium source, and hydrocolloid thickeners in water to produce a gravy, adjusting the pH of the gravy, optionally cooling until a gel is formed and shearing to produce a sheared gel gravy, adding food chunks, heat treating, and cooling to produce a chunk in jelly cat food composition.

In particular, the invention relates to a process for making a chunk-in-jelly cat food composition comprising:

mixing mechanically disrupted red seaweed, a potassium source, and hydrocolloid thickeners in water to produce a gravy, wherein the gravy comprises 0.2-2% wt. mechanically disrupted red seaweed;

adjusting the pH to 7 or above;

optionally cooling until a gel is formed;

shearing to produce a sheared gel gravy;

adding food chunks;

filling a receptacle with the sheared gel gravy and food chunks;

heat treating the receptacle to at least 75° C.; and cooling to produce a chunk in jelly cat food composition.

In one embodiment, the gravy can comprise 0.3-0.6% wt. of mechanically disrupted red seaweed. If the gravy comprises less than 0.2% wt. of mechanically disrupted red seaweed, then a gel is unlikely to be formed.

In one embodiment, the red seaweed is selected from the group consisting of *Euchema cottonii, Euchema spinosum, Chondrus crispus*, and mixtures thereof.

In one embodiment, the red seaweed is selected from *Euchema cottonii* and *Chondrus crispus*.

In one embodiment, the potassium source is potassium chloride.

In one embodiment, the gravy comprises 0.1 to 2% wt. potassium chloride, preferably about 0.17% wt.

In one embodiment, the hydrocolloid thickeners are selected from the group consisting of xanthan gum, guar gum, arabic gum, locust bean gum, cassia gum, microcrystalline cellulose, preferably selected from xanthan gum, guar gum, locust bean gum, and mixtures thereof.

In one embodiment, the hydrocolloid thickeners are selected from xanthan gum and locust bean gum.

In one embodiment, the hydrocolloid system, the pet food composition, and/or the chunk-in-jelly cat food composition is free from gelling agents selected from the group consisting of gellan gum, kappa-, iota-carrageenan, alginate, agar, pectin, and mixtures thereof.

In one embodiment, the concentration of hydrocolloid thickeners is between 0.05-5% wt. in the gravy, preferably about 1% wt in the gravy.

In one embodiment, the concentration of hydrocolloid thickeners is less than 0.5% wt. in the chunk and jelly cat food composition.

In one embodiment, the pH of the gravy is adjusted to between 7 and 9.

In one embodiment, an additional step can comprise cooling until reaching the gel point of the seaweed followed by shearing after adjusting the pH of the gravy and before the addition of the food chunks to create a sheared gel gravy.

In one embodiment, the viscosity of the gravy is above 2000 MPa·s (20 rpm, 20° C., RVT Brookfield) so that when the food chunks are added, a stable suspension can be formed for a 1-step filling. For example, in one aspect, approximately equal amounts of gravy and food chunks can be placed in each receptacle with an acceptable level of variation.

In one embodiment, the food chunks are meat, gluten or any other vegetable protein source and combinations thereof.

In one embodiment, the heat treatment of the receptacle is at a temperature above 80° C. for at least 1 minute, preferably at least 120° C. for 30-60 minutes.

In one embodiment, the cooling and shearing step comprises the steps of:

adding water to reduce the temperature until reaching the seaweed gel point (about 45-60° C.); and shearing the resulting gravy at or below the seaweed gel point to form a stable sheared gel gravy with a viscosity above 2000 MPa·s (20 rpm, 20° C., RVT Brookfield) enabling a 1-step filling process.

In one embodiment, the gravy is mixed with the food chunks in an approximate 50:50 ratio.

The invention also relates to a chunk-in-jelly cat food composition made by a process as described hereinabove.

Additionally, the invention relates to a hydrocolloid system comprising mixing mechanically disrupted seaweed and other ingredients in water to form the hydrocolloid system. Further, the present invention relates to a gravy and a pet food composition, including a chunk-in-jelly cat food composition, where the composition comprises 0.1-1% wt. of mechanically disrupted red seaweed, a potassium source, hydrocolloid thickeners, food chunks, and wherein the composition is at a pH of 7 or above.

In one embodiment, the chunk-in-jelly cat food composition comprises 0.15-0.3% wt. of a red seaweed.

In one embodiment, the pH of the chunk in jelly cat food composition is between 7 and 9.

In one embodiment, the potassium source is potassium chloride.

In one embodiment, the potassium chloride is present at 0.05 to 1% wt. in the chunk and jelly cat food composition, preferably at about 0.085% wt.

In one embodiment, the hydrocolloid thickeners are selected from the group consisting of xanthan gum, guar gum, arabic gum, locust bean gum, cassia gum, microcrystalline cellulose, preferably selected from xanthan gum, guar gum, locust bean gum, and mixtures thereof.

In one embodiment, the hydrocolloid thickeners are selected from xanthan gum and locust bean gum.

In one embodiment, the hydrocolloid system and/or the pet food composition, including a chunk-in-jelly cat food composition, is free from gelling agents selected from the group consisting of gellan gum, kappa-carrageenan, iota-carrageenan, alginate, agar, pectin, and mixtures thereof.

In one embodiment, the concentration of hydrocolloid thickeners are between 0.025-2.5% wt. in the composition, preferably about 0.5% wt.

In one embodiment, the concentration of hydrocolloid thickeners are less than 0.25% wt. in the pet food composition, e.g., a chunk-in-jelly cat food composition.

In one embodiment, the food chunks are meat, gluten or any other vegetable protein source and combinations thereof.

EXAMPLES

Example 1: Physical Properties of the Seaweeds

The seaweed physical properties such as jellification were compared. Temperature sweep cycles were performed in the rheometer to determine the gelling temperature of the several hydrocolloid systems considered.

The rheological performance of *Eucheuma cottonii* and *Chondrus crispus* seaweeds were compared to semi-refined kappa carrageenan to understand the gelation kinetics (mechanical spectra obtained of the gel structures). Promising results were obtained for the gel structure formed of the *E. cottonii* seaweed, especially in presence of potassium chloride ions.

8

TABLE 1

| | pH = 7 & 0.15% KCl 0.3% guar gum | pH = 8.5 & 0.15% KCl 0.3% guar gum & 0.4% K₂CO₃ |
|---|---|---|
| Semi-refined kappa-carrageenan | 38° C. | 50° C. |
| *Eucheuma Cottonii* | 35° C. | 48° C. |
| *Chondrus Crispus* | 28° C. | 40° C. |

These gelling temperatures were obtained studying the jelly in water without retorting. In case of the processed/retorted chunks in jelly, results should present the same tendency.

Promising results were obtained for the gel structure formed by the *E. cottonii* seaweed in presence of potassium chloride and potassium carbonate.

Two tests were performed. The first one was made at pH=7 with 0.15% KCl & 0.3% guar gum. The second was at pH=8.5 with 0.15% KCl, 0.3% guar gum & 0.4% $K_2CO_3$.

It was observed that *E. cottonii* & semi-refined kappa-carrageenan present a similar temperature of jellification. There is a significant difference between *E. cottonii* and *C. crispus* concerning the temperature of jellification. With KCl and pH=7, the temperature of jellification is around 38° C. for the kappa, 35° C. for *E. cottonii* and 28° C. for *C. crispus*.

There is a significant difference between *E. cottonii* and *C. crispus* concerning the viscosity and temperature of jellification. With $K_2CO_3$ and pH=8.5, the temperature of jellification is around 50° C. for the kappa, 48° C. for *E. cottonii* and 40° C. for *C. crispus*.

Example 2: Jelly Recipes Used for the Chunk-In-Jelly Cat Food Compositions

The jelly recipes for the different chunk-in-jelly cat food compositions are shown in Table 2 below (in % wt. of the jelly).

The same red seaweed species (*Chondrus crispus*) from a commercially available source (available from NUWEN BY SETALG-AGROALIMENTAIRE, Presqu'île De Pen Lan, 22610 Pleubian, FRANCE) was used with different particle sizes.

TABLE 2

| | REF. (wt %) | T.1 (wt %) | T.2 (wt %) | T.3 (wt %) | T.4 (wt %) | T.5 (wt %) |
|---|---|---|---|---|---|---|
| Gums (thickeners) | 1.00 | 1.00 | 1.00 | 1.00 | 1.00 | 1.00 |
| Potassium Carbonate | | 0.200 | 0.200 | 0.200 | 0.400 | 0.400 |
| Gum Kappa Carageenan | 0.300 | | | | | |
| Seaweed *Chondrus Crispus* D90 < 150 microns | | 0.300 | | | 0.300 | 0.900 |
| Seaweed *Chondrus Crispus* D90 < 2000 microns | | | 0.300 | | | |
| Seaweed *Chondrus Crispus* 0.5-2 cm | | | | 0.300 | | |
| Potassium Chloride | 0.170 | 0.170 | 0.170 | 0.170 | 0.170 | 0.170 |
| Flavoring agents | 2.36 | 2.36 | 2.36 | 2.36 | 2.36 | 2.36 |
| Water | 96.17 | 95.97 | 95.97 | 95.97 | 95.77 | 95.47 |

Example 3: Production Process for Chunk-In-Jelly Cat Food Compositions with Red Seaweed

*Chondrus crispus* red seaweed was dry mixed with the other powders (potassium carbonate, potassium chloride, thickeners, flavoring agents) in the amounts listed in the table above. The dry mix was added to a B22 dispersion tank (Karl Schnell) and mixed at 3000 rpm at room temperature until complete solubilization of salts and thickeners. At this point, the red seaweed was dispersed in the water phase. The dispersion containing seaweed and solublized salts and gums was then mixed with meat chunks and transferred into cans using a one step process. The cans were then sealed and retorted in a sterilization step (120° C. for at least 30 minutes).

The final chunk-in-jelly cat food compositions are shown in FIG. 1. It can be seen that the compositions retained optimal shape. The chunks were equally distributed in the jelly. The T1-T5 compositions were as good as the reference.

Example 4: Gel Rigidity of Chunk-In-Jelly Cat Food Composition with Red Seaweed A Rheo TA XT2 texture analyzer was used to measure the hardness characteristics of the jellies made by the recipes in Table 2. The jelly comprised all ingredients mentioned in example 2, except the food gluten chunks.

The chunk-in-jelly cat food composition was heated. The resulting gravy was separated from the gluten chunks by sieving with a 1 mm sieve. Gelation was induced by cooling and the hardness of the resulting jellies were measured via penetrometry at room temperature using a cylindrical probe of 12 mm diameter, speed of 0.5 mm/sec and 10 mm penetration. Five replicate measurements were performed and the force of penetration at 4 mm was recorded.

Table 3 displays the maximum force and gel rigidity for different chunk in jelly recipes. By varying the amount of seaweed and salt levels in recipes 2 to 6, different levels of texture were achieved.

TABLE 3

| Product recipes | Average Force max in g force | Average Rigidity/ slope g/mm |
|---|---|---|
| Reference | 158.06 | 28.30 |
| T.1 | 18.87 | 1.75 |
| T.2 | 14.67 | 1.61 |
| T.3 | 16.21 | 1.58 |
| T.4 | 12.76 | 1.32 |
| T.5 | 34.08 | 5.23 |

Example 5: Cat Palatability Results of Chunk-In-Jelly Cat Food Compositions with Red Seaweed The performance of the products were measured via technical palatability evaluation. This involved conducting a quantitative measurement of cat food preference in a controlled environment using validated pet sensory panelists.

The comparative test used was a two-bowl paired palatability test where the preference between two foods offered at the same time was measured by quantifying the amount consumed of each of the two foods. The main dependent measure was mean percent consumption for each food and significant difference was set at P value <0.05.

Surprisingly, in spite of the differences in gel strengths, the cats did not distinguish between the reference product and the seaweed trials, as shown in table 4 below, no significant differences were found.

TABLE 4

| Cat consumption | | | | |
|---|---|---|---|---|
| K-carrageenan | Trial | | p-Values | |
| 53.9 | 46.1 | T.1 | 0.43 | NS - not significantly different |
| 49.4 | 50.6 | T.2 | 0.917 | NS - not significantly different |
| 48.8 | 51.2 | T.3 | 0.836 | NS - not significantly different |
| 59.3 | 40.7 | T.4 | 0.122 | NS - not significantly different |
| 60.7 | 39.3 | T.5 | 0.176 | NS - not significantly different |

Example 6: Chunk-In-Jelly Cat Food Compositions with Sheared Gel Gravy from Red Seaweed Recipes for the different chunk-in-jellies with seaweed composition in % wt. The same red seaweed species (*Chondrus crispus*) from a commercially available source was used (available from NUWEN BY SETALG-AGROALIMENTAIRE, Presqu'île De Pen Lan, 22610 Pleubian, FRANCE).

TABLE 5

| | REF. (wt %) | T.1 (wt %) | T.2 (wt %) |
|---|---|---|---|
| Gums (thickeners & stabilizers) | 1.00 | | |
| Gum Xanthan | | 0.250 | 0.250 |
| Gum Locust Bean | | 0.250 | 0.250 |
| Potassium Carbonate | | 0.200 | 0.200 |
| Gum Kappa Carageenan | 0.300 | 0.300 | |
| Seaweed *Chondrus Crispus* D90 < 2000 microns | | | 0.300 |
| Potassium Chloride | 0.170 | 0.170 | 0.170 |
| Flavoring agents | 2.36 | 2.36 | 2.36 |
| Water | 96.17 | 96.37 | 96.37 |
| Viscosity (mPa · s) | 3300 | 3500 | 3600 |

The process used to prepare the gravy reference is the same as in example 2. The process to prepare the gravies T1 and T2 was the following:

Mixing red seaweed, potassium chloride, gums at 80° C. in 50% of water (about 100 liters of water in a dispersion tank);

adjusting the pH to 8.5 with potassium carbonate;

adding remaining 50% of water (cold 15° C.) until a gel formed (about 45° C.);

decreasing the temperature decreased from 80° C. to 50° C.;

shearing the resulting gravy for 10 minutes (3000 rpm) in a Ystral mixer until a sheared gel gravy was formed, with final viscosity of 4000 MPa·s (20 rpm, 40° C., RVT Brookfield);

mixing the sheared gel gravy with the chunks;

perform 1 step filling at 20° C.; and heat treating at 130° C.

The advantage of using the sheared gel gravy approach includes a significant reduction in total amount of added hydrocolloids used; from 1.3% down to 0.5%. This reduction in total amount of hydrocolloids is expected to improve cat fecal consistency.

Another advantage of using the sheared gel gravy approach is that the viscosity remains constant at room temperature with time whereas a reduction of viscosity is typically shown when only thickeners such as guar and xanthan gum are used.

Example 7: Digestibility Tests of Chunks in Jelly Product

The fecal consistency (FC) in vivo (cat & dog) was tested on the chunk in jelly products. The fecal consistency of the seaweeds products was similar or higher than standards with semi refined kappa carrageenan. Fecal consistency is better with lower xanthan and carob quantities for *C. crispus* jelly. Using fluid gel technology improves the fecal consistency (from 72% to 89%) for *E. cottonii.*

Studies of the impact of the total quantity of hydrocolloids (HC) on fecal consistency (FC) show that the FC is better with a lower quantity of HC. With the same level of total hydrocolloid, the same good fecal consistency results are obtained with kappa and seaweeds. When the quantity of hydrocolloids are reduced and fluid gel technology is used, improved fecal consistency results for seaweeds compared to the standard are obtained.

To conclude, comparing the acceptable fecal scores among three hydrocolloid systems tested, clearly, the fecal score is improved when using the seaweeds in the jelly with fluid gel technology and reducing the total of HC. The reason for this improvement can be the significantly lower percent hydrocolloid used (about 50% less) when using the fluid gel versus the classic jelly.

The invention claimed is:

1. A cat food composition comprising chunks in a gravy, the gravy having a pH from 8.1 to 9.0 and comprising a hydrocolloid system comprising mechanically disrupted red seaweed, the hydrocolloid system in the gravy further comprising at least one hydrocolloid thickener.

2. The cat food composition of claim 1, wherein the mechanically disrupted red seaweed is selected from *Euchema cottonii, Euchema spinosum* and *Chondrus crispus.*

3. The cat food composition of claim 1, wherein the at least one hydrocolloid thickener in the hydrocolloid system in the gravy is selected from the group consisting of xanthan gum, guar gum, arabic gum, locust bean gum, *cassia* gum, microcrystalline cellulose, and mixtures thereof.

4. The cat food composition of claim 1, wherein the gravy is free from gellan gum.

5. The cat food composition of claim 1, wherein the mechanically disrupted red seaweed is 0.3-0.6 wt. % of the gravy.

6. The cat food composition of claim 1, wherein the mechanically disrupted red seaweed is 0.15-0.3% wt. of the cat food composition.

7. The cat food composition of claim 1, wherein the at least one hydrocolloid thickener is 0.05-1 wt. % of the gravy.

8. The cat food composition of claim 1, wherein the at least one hydrocolloid thickener is less than 0.05 wt. % of the gravy.

9. The cat food composition of claim 1, wherein the at least one hydrocolloid thickener is 0.025-0.5 wt. % of the cat food composition.

10. The cat food composition of claim 1, wherein the at least one hydrocolloid thickener is less than 0.25 wt. % of the cat food composition.

11. The cat food composition of claim 1, wherein the pH of the gravy is from 8.5 to 9.0.

\* \* \* \* \*